US012422110B2

(12) United States Patent
Grandadam

(10) Patent No.: US 12,422,110 B2
(45) Date of Patent: Sep. 23, 2025

(54) PORTABLE LIGHTING DEVICE WITH AN ILLUMINATED INDICIA

(71) Applicant: Promier Products Inc., Peru, IL (US)

(72) Inventor: Cody Duane Grandadam, Peru, IL (US)

(73) Assignee: Promier Products Inc., Peru, IL (US)

( * ) Notice: Subject to any disclaimer, the term of this patent is extended or adjusted under 35 U.S.C. 154(b) by 0 days.

(21) Appl. No.: 18/627,547

(22) Filed: Apr. 5, 2024

(65) Prior Publication Data

US 2024/0271763 A1 Aug. 15, 2024

Related U.S. Application Data

(63) Continuation of application No. 18/157,912, filed on Jan. 23, 2023, now Pat. No. 11,953,164, which is a (Continued)

(51) Int. Cl.
*F21L 4/02* (2006.01)
*F21V 5/00* (2018.01)
(Continued)

(52) U.S. Cl.
CPC .............. *F21L 4/022* (2013.01); *F21V 5/006* (2013.01); *F21V 5/04* (2013.01); *F21V 7/0075* (2013.01); *F21V 14/065* (2013.01)

(58) Field of Classification Search
CPC ............. F21V 23/0414–0428; F21L 4/00–085
See application file for complete search history.

(56) References Cited

U.S. PATENT DOCUMENTS 1,645,487 A * 10/1927 Harling ..................... F21L 4/02 362/205
10,578,297 B1 * 3/2020 Zhu ......................... F21L 4/027
(Continued)

FOREIGN PATENT DOCUMENTS

CN 204240070 U * 4/2015

*Primary Examiner* — Mariceli Santiago
(74) *Attorney, Agent, or Firm* — Barnes & Thornburg LLP

(57) ABSTRACT

The invention provides a portable lighting device with an elongated main body that includes a housing with receiver, and a power source positioned within the receiver. An operational mode selector assembly with a switch assembly that is actuated by a user is operatively coupled to the power source. An illumination assembly is electrically coupled to both the operational mode selector and the power source. The illumination assembly has a primary light source with a light emitter that emits light axially along a longitudinal axis of the main body or housing through a lens. A secondary light source with a light emitter emits light substantially perpendicular to the axis to illuminate an indicia located in a side region of the illumination assembly. During operation of the portable lighting device, the components of the illumination assembly are arranged such that: (i) the primary light source does not illuminate the indicia, (ii) the secondary light source does not emit light through the lens, (iii) an appreciable amount of light emitted from the primary light source does not mix with light that is emitted from the secondary light source within the portable lighting device, and (iv) an appreciable amount of light emitted from the secondary light source does not mix with light that is emitted from the primary light source within the portable lighting device.

20 Claims, 16 Drawing Sheets

Related U.S. Application Data continuation of application No. 17/509,619, filed on Oct. 25, 2021, now Pat. No. 11,560,988, which is a continuation of application No. 17/114,471, filed on Dec. 7, 2020, now Pat. No. 11,156,330.

(60) Provisional application No. 62/944,113, filed on Dec. 5, 2019.

(51) Int. Cl.
*F21V 5/04* (2006.01)
*F21V 7/00* (2006.01)
*F21V 14/06* (2006.01)

(56) References Cited

U.S. PATENT DOCUMENTS

| | | | | |
|---|---|---|---|---|
| 2007/0139916 | A1* | 6/2007 | Vermillion | F21L 4/005 362/208 |
| 2016/0033092 | A1* | 2/2016 | Killion | F21L 4/027 362/184 |

* cited by examiner

PORTABLE LIGHTING DEVICE WITH AN ILLUMINATED INDICIA

CROSS-REFERENCE TO RELATED APPLICATIONS

This application is a continuation of U.S. patent application Ser. No. 18/157,912, which is a continuation of U.S. Pat. No. 11,560,988, which is a continuation of U.S. Pat. No. 11,156,330, which claims the benefit of Provisional Patent Application No. 62/944,113, all of which are incorporated in their entirety herein by reference and made a part hereof.

TECHNICAL FIELD

This disclosure relates to a portable lighting device, such as a flashlight, having a primary light source and a secondary light source, where the secondary light source illuminates an indicia, symbol or pattern without the primary light source.

BACKGROUND

Existing lighting products enable a wide range of indoor, outdoor and nighttime activities. Electronic lighting is typically provided from fixed installations (e.g., a roof, a wall, or ceiling), where a light source receives electrical power from a fixed and wired power source. Such lighting is useful in illuminating a particular area, but lacks the flexibility of a portable lighting source. Portable lighting sources, such as flashlights or lanterns, have been developed to provide illumination in varied locations and situations. However, brand recognition and/or brand awareness of such lights is limited, especially in dark or low-light conditions. Additionally, portable lighting sources can be difficult to locate in dark or low-light conditions, or in the absence of other lighting sources, which is when these lighting sources are often most needed. For example, when flashlights or lanterns are taken into remote locations, such as during a camping trip, the flashlights or lanterns are difficult to locate in dark tents or dark outdoor conditions. Therefore, the performance and utility of conventional flashlights and lanterns are compromised in dark or near-dark conditions.

Accordingly, there is an unmet need for a portable lighting device, such as a flashlight or lantern, that provides both a primary light source and a secondary light source, where the latter illuminates an indicia, symbol or pattern. The indicia, symbol or pattern can increase the awareness of the flashlight brand or model, which may increase the overall value of the flashlight manufacture's brand. Additionally, the indicia, symbol or pattern may aid a user in finding the flashlight in a dark or low-light condition. A full discussion of the features and advantages of the present invention is deferred to the following detailed description, which proceeds with reference to the accompanying drawings.

SUMMARY OF THE INVENTION

The invention provides a portable lighting device with an elongated main body that includes a housing with receiver, and a power source positioned within the receiver. An operational mode selector assembly with a switch assembly that is actuated by a user is operatively coupled to the power source. An illumination assembly is electrically coupled to both the operational mode selector and the power source. The illumination assembly has a primary light source with a light emitter that emits light axially along a longitudinal axis of the main body or housing through a lens. A secondary light source with a light emitter emits light substantially perpendicular to the axis to illuminate an indicia located in a side region of the illumination assembly. The illumination assembly also has a collimator located between the first light source and the second light source, wherein the collimator constrains passage of light emitted from the first and second light sources, as discussed below.

According to another aspect of the invention, during operation of the portable lighting device, the components of the illumination assembly, including the first and second light sources and the collimator, are purposely arranged such that: (i) the primary light source does not illuminate the indicia, (ii) the secondary light source does not emit light through the lens, (iii) an appreciable amount of light emitted from the primary light source does not mix with light that is emitted from the secondary light source within the portable lighting device, and (iv) an appreciable amount of light emitted from the secondary light source does not mix with light that is emitted from the primary light source within the portable lighting device.

According to another aspect of the invention, the portable lighting device is configured as a flashlight or lantern. A full discussion of the features and advantages of the portable lighting device presented in the following detailed description, which includes reference to the accompanying Figures.

BRIEF DESCRIPTION OF THE DRAWINGS

The drawing figures depict one or more implementations in accord with the present teachings, by way of example only, not by way of limitation. In the figures, like reference numerals refer to the same or similar elements.

Figure 1:
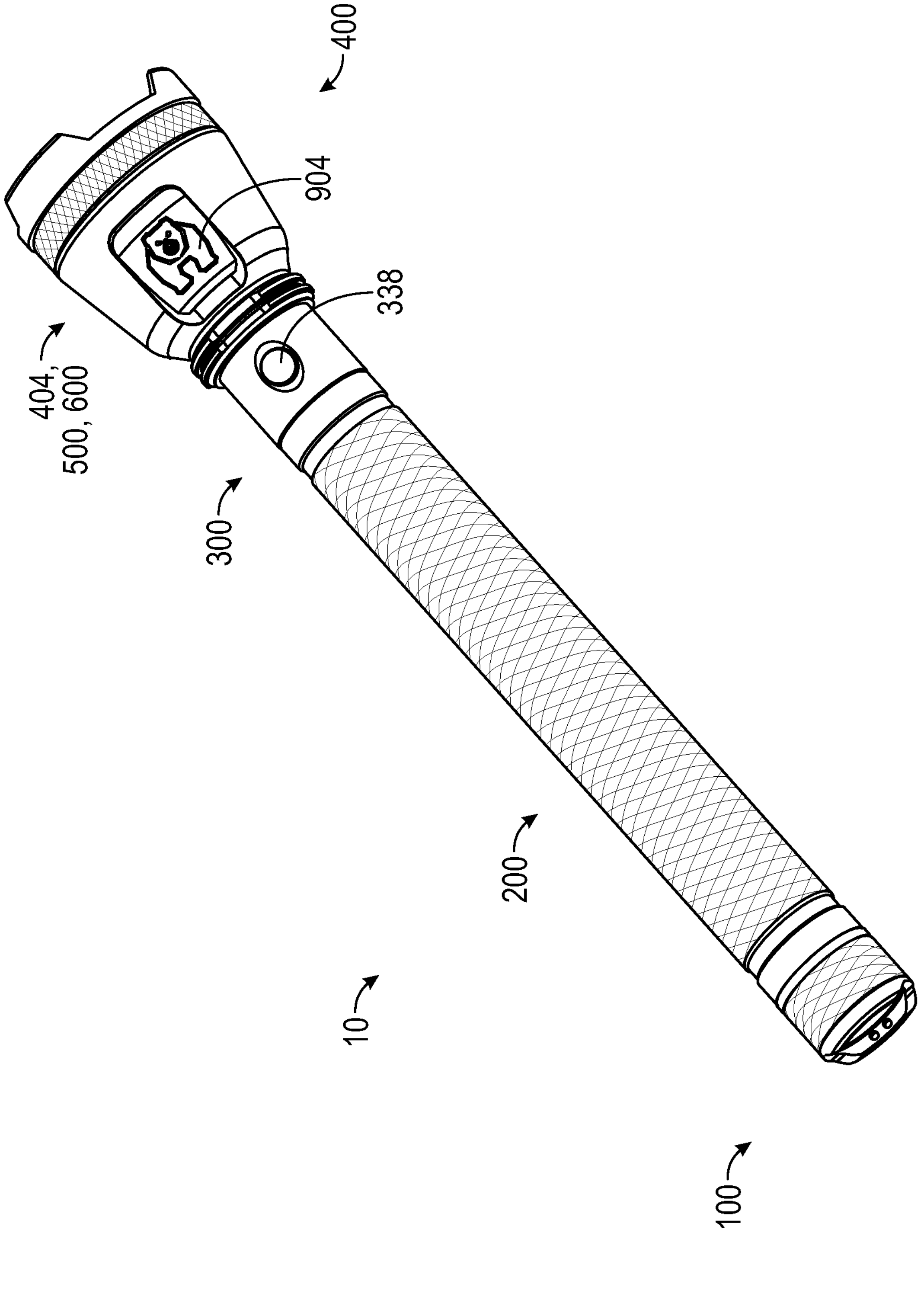
FIG. 1 is a perspective view of a first embodiment of a flashlight of the invention showing a first endcap, an elongated main body with a housing having a knurled grip, a mode selector housing with an operating button.
Figure 5:
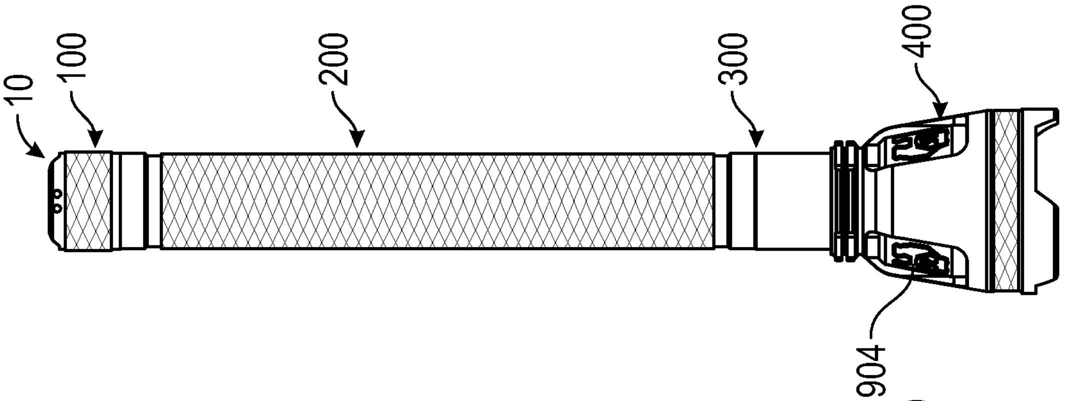
FIG. 5 is a rear view of the flashlight of FIG. 1.
Figure 4:
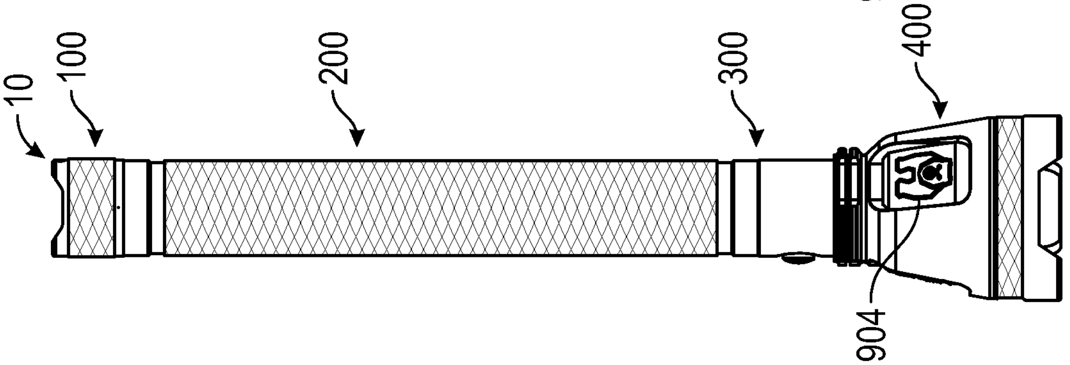
FIG. 4 is a right side view of the flashlight of FIG. 1.
Figure 3:
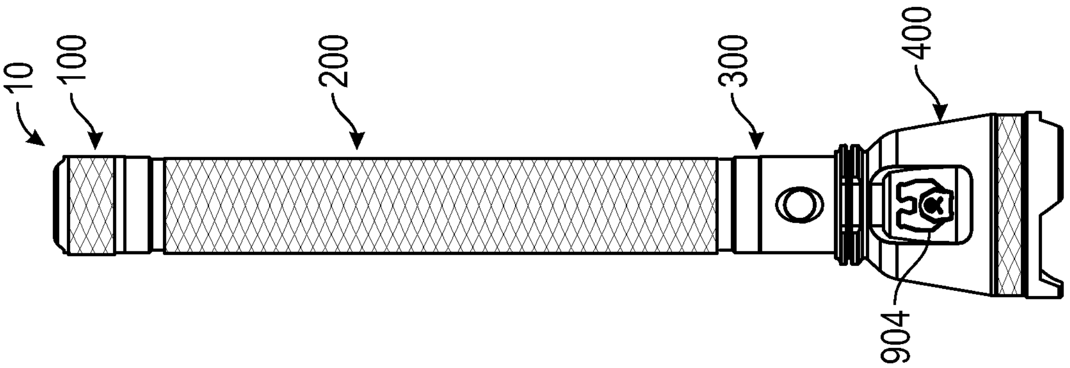
FIG. 3 is a front view of the flashlight of FIG. 1.
Figure 2:
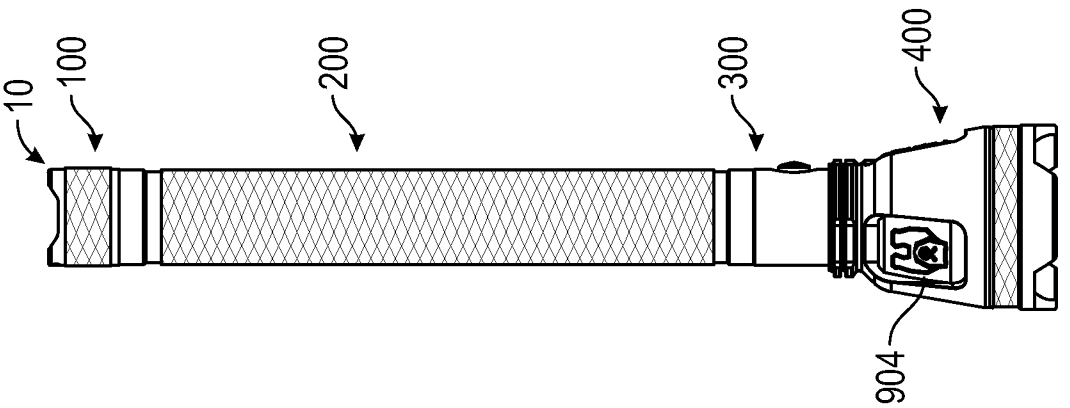
FIG. 2 is a left side view of the flashlight of FIG. 1.
Figure 7:
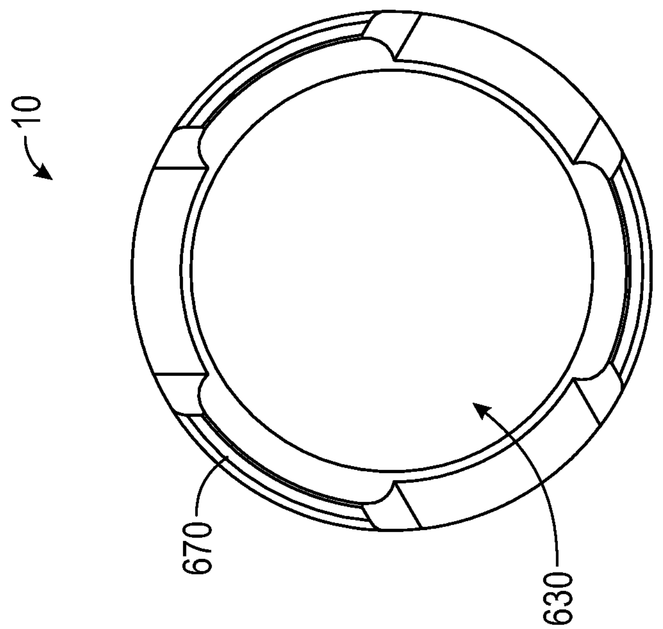
FIG. 7 is a top view of the flashlight of FIG. 1.
Figure 6:
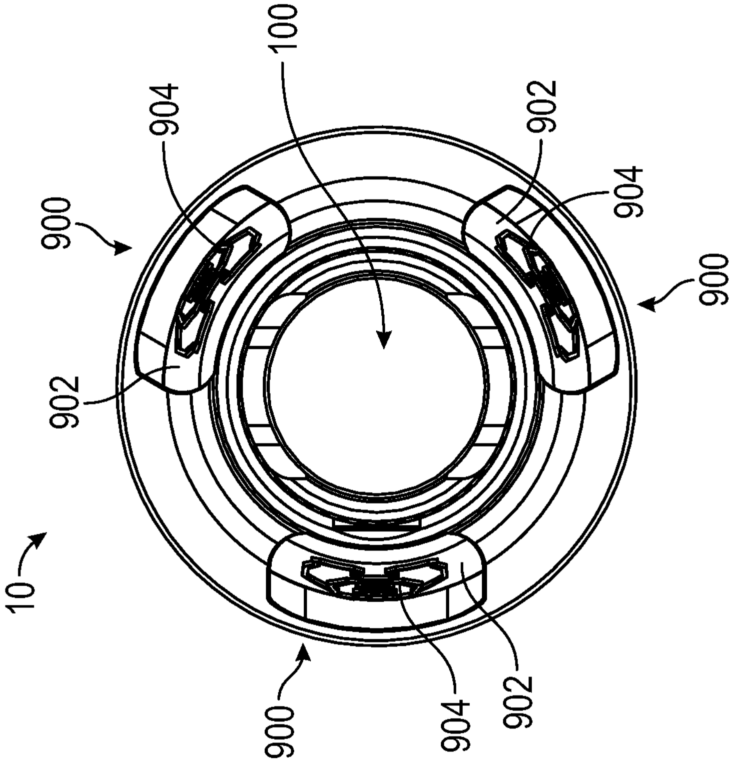
FIG. 6 is a bottom view of the flashlight of FIG. 1.
Figure 8:
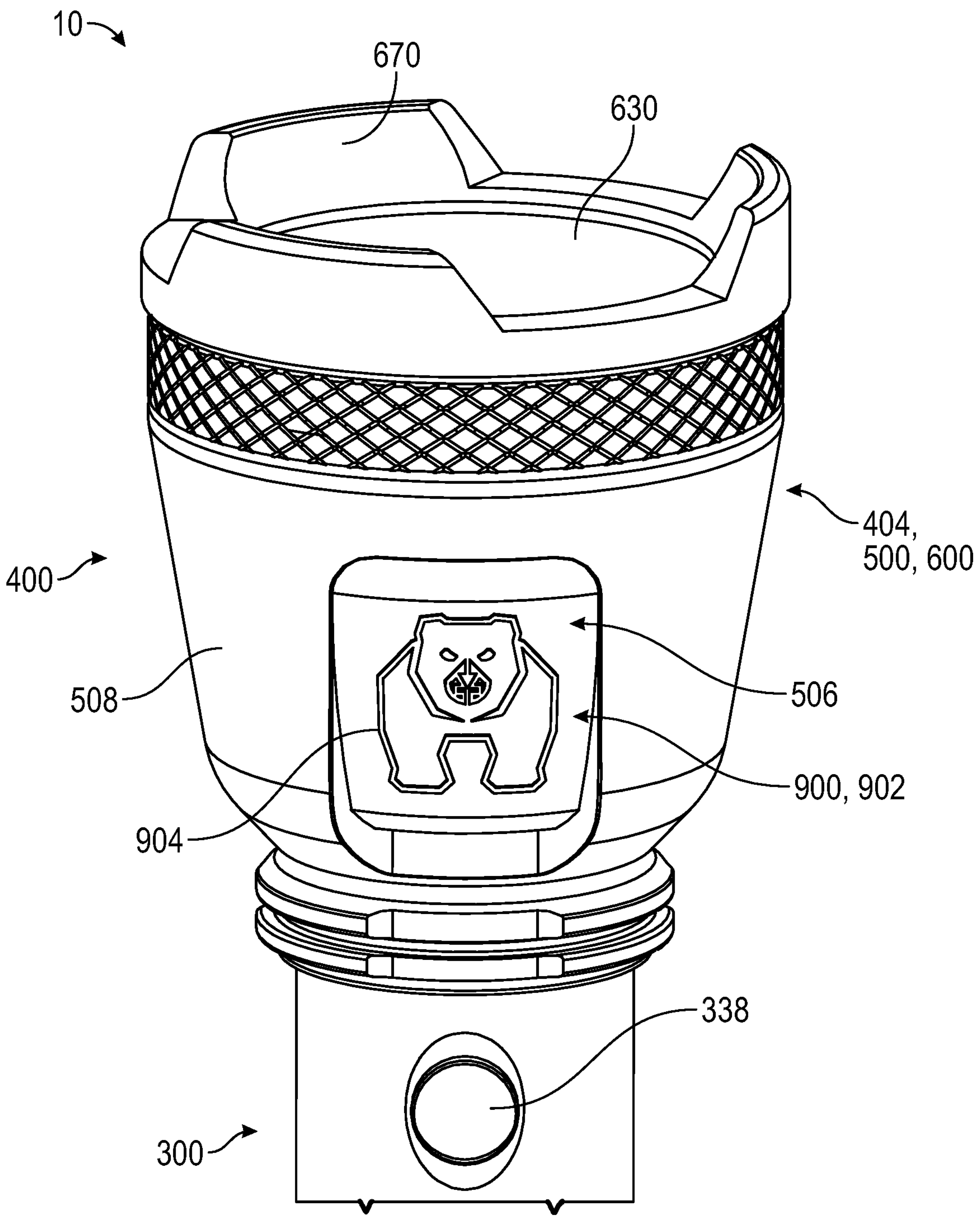
FIG. 8 is a perspective view of the illumination assembly of the flashlight of FIG. 1, showing an indicia that can be selectively illuminated by the secondary lighting source.
Figure 9:
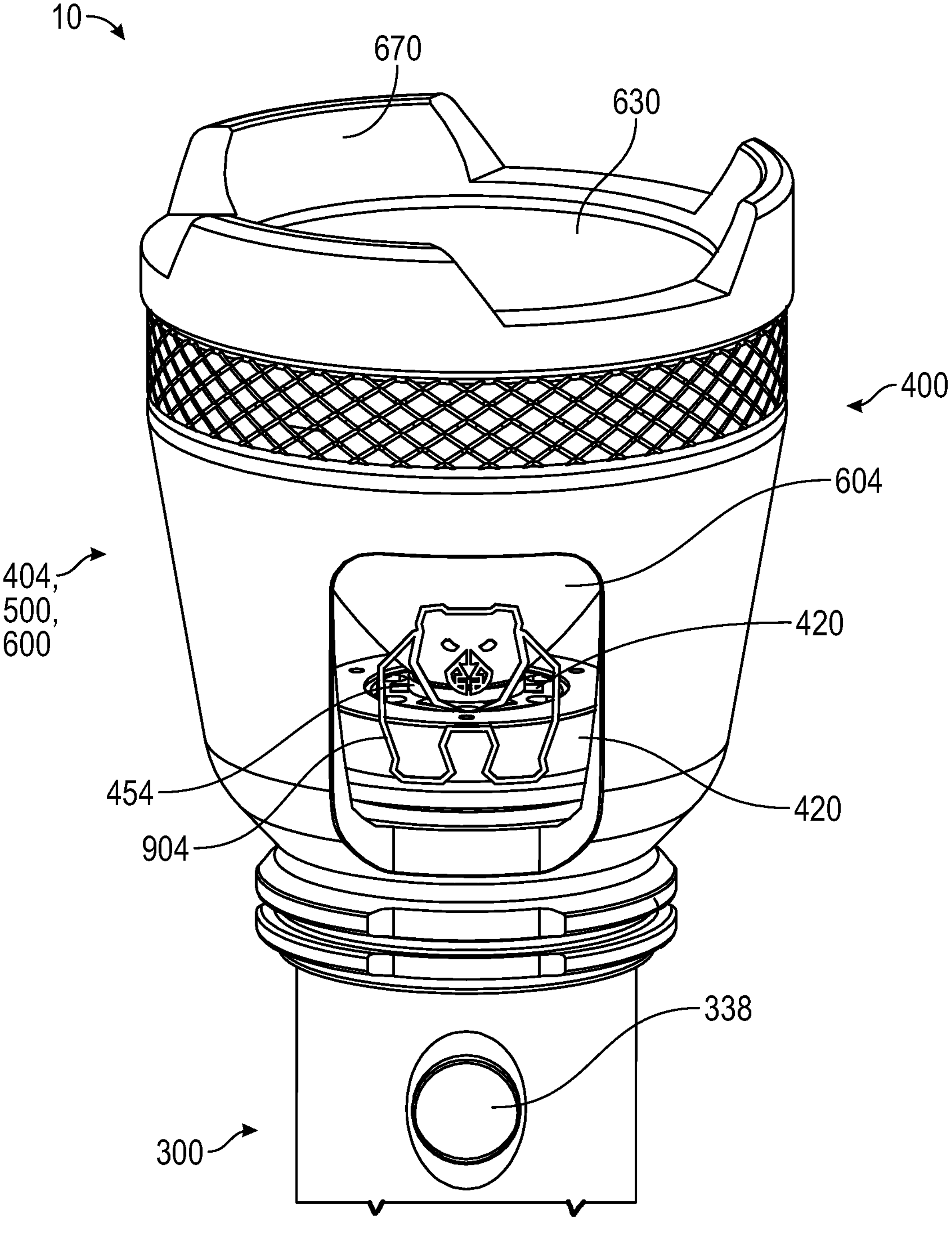
FIG. 9 is a perspective view of the illumination assembly of FIG. 8, wherein an extent of the illumination assembly has been hidden to show the secondary lighting source positioned behind or inward of the indicia.
Figure 10:
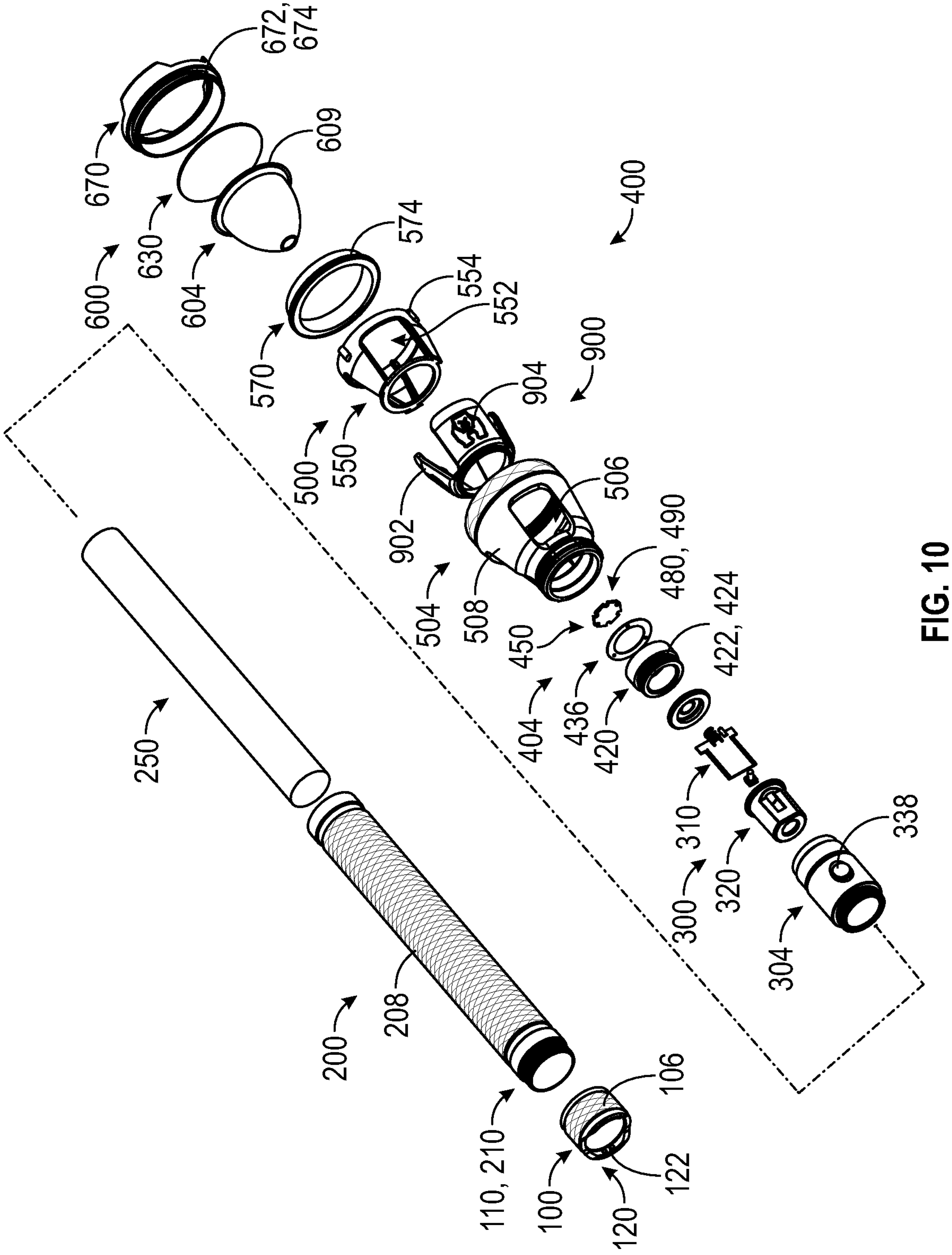
FIG. 10 is an exploded view the flashlight of FIG. 1.
Figure 11:
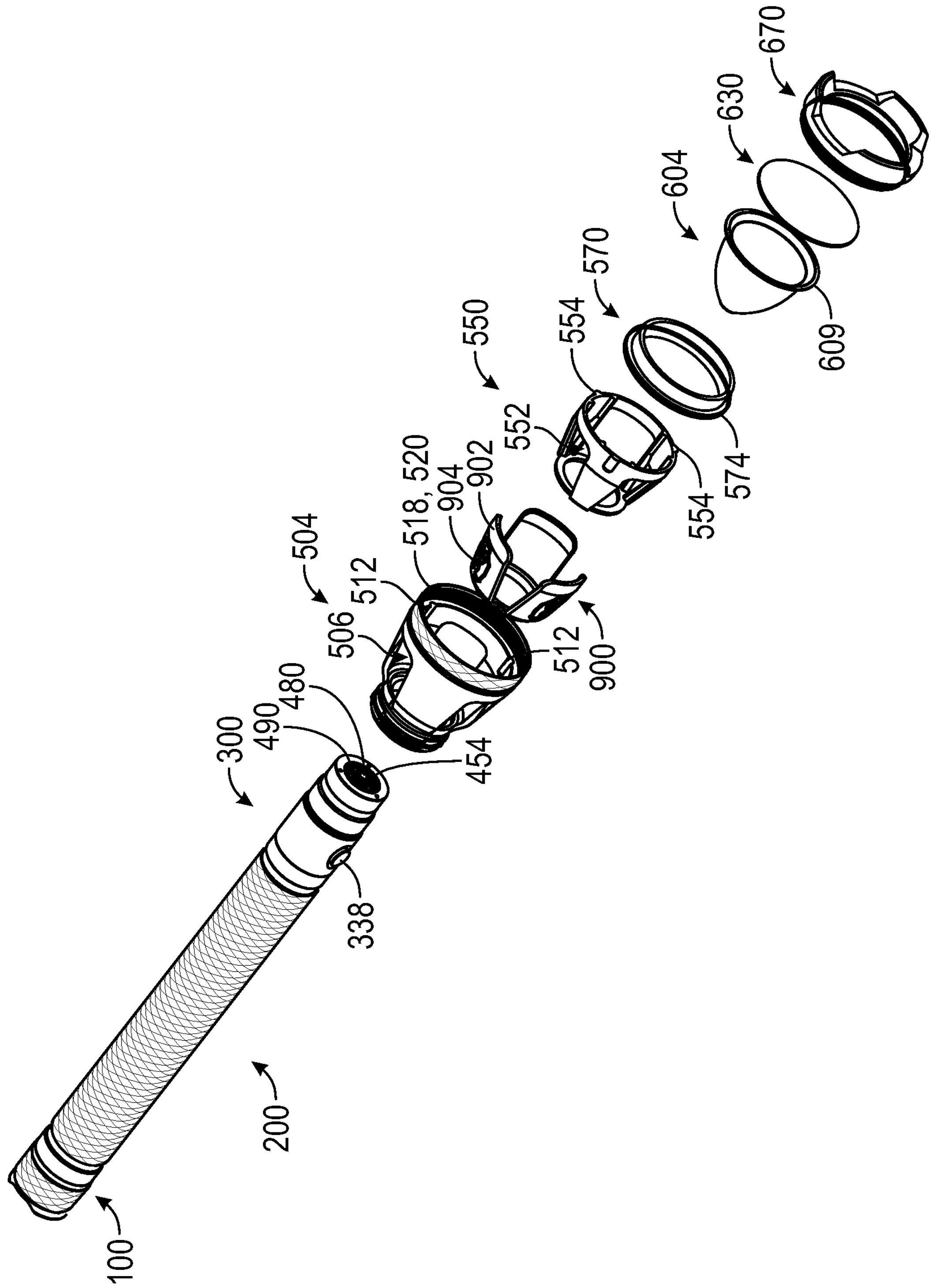
FIG. 11 is first partially exploded view of the flashlight of FIG. 1.
Figure 12:
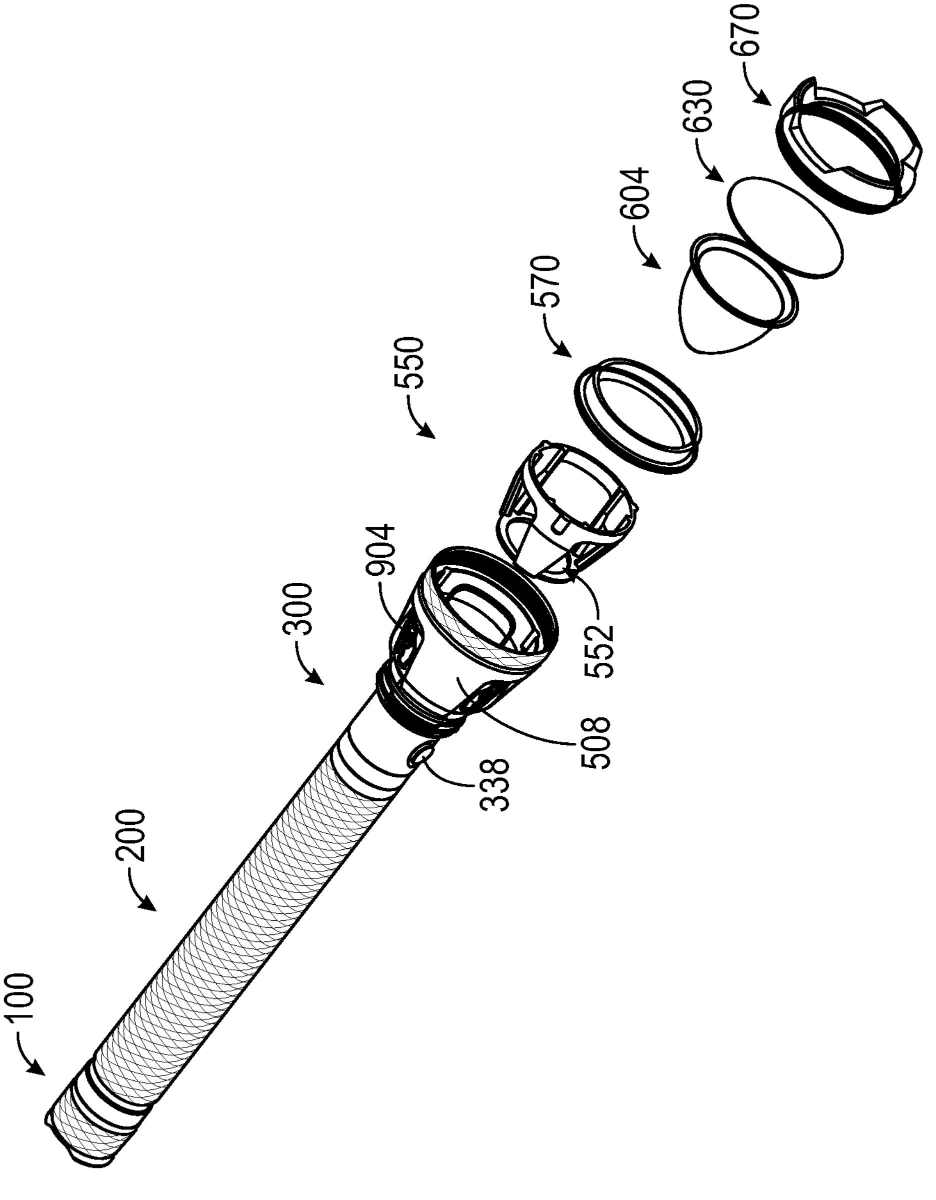
FIG. 12 is a second partially exploded view of the flashlight of FIG. 1.

While the invention will be described in connection with the preferred embodiments shown herein, it will be understood that it is not intended to limit the invention to those embodiments. On the contrary, it is intended to cover all alternatives, modifications, and equivalents, as may be included within the spirit and scope of the invention as defined by the appended claims. In the figures, like reference numerals refer to the same or similar elements.

DETAILED DESCRIPTION

While this disclosure includes a number of details and embodiments in many different forms, there is shown in the drawings and will herein be described in detail particular embodiments with the understanding that the present disclosure is to be considered as an exemplification of the principles of the disclosed methods and systems, and is not intended to limit the broad aspects of the disclosed concepts to the embodiments illustrated.

The flashlight 10 is portable and includes: (i) an end cap 100, (ii) an elongated main body 200, (iii) an operational mode selector assembly 300, and (iv) an illumination assembly 400 that includes a primary light source 480, a secondary light source 490 and an indicia assembly 500. The indicia assembly 500 includes at least one indicia 904 that can be selectively illuminated in response to activating the operational mode selector assembly 300 or various external stimuli. The indicia 904 is illuminated by only the secondary light source 490 and not illuminated by the primary light source 480. Additionally, the secondary light source 490 is configured to only illuminate the indicia 904 and not illuminate an object positioned a distance away from the user and/or the flashlight 10, such as an object positioned in front of the primary light source 480. When the indicia 904 is illuminated, the indicia 904 can help a user identify the brand or model of the flashlight and/or assist the user in locating the flashlight 10 in a low-light or dark environment. Identification of the brand or model of the flashlight 10 may be valuable because it may increase user awareness of the brand or model within the marketplace and, in turn, increase the value of the brand or model. The flashlight 10 can have several illumination modes (e.g., "On," "Dim," "Off," or "Flashing"), and these illumination modes can apply to the primary light source 480, the secondary light source 490, or both. Additionally, the primary light source 480 can be individually illuminated without illuminating the secondary light source 490, and the secondary source 490 can be individually illuminated without illuminating the primary light source 480. These illumination modes can be controlled by a physical switch, a timer, or triggered by various sensors in response to environmental stimuli.

Referring to FIGS. 1-6, 10-14, 16, 18, the end cap 100 is designed to releasably couple the power source 250 within the elongated main body 200. The end cap 100 includes: (i) end cap engaging means 110 and (ii) external attaching means 120. The end cap engaging means 110 is a set of end cap threads 112 designed to mate with the end cap threads 212 contained on the first end 202 of the main body 200 to retain the power source 250 within the main body 200. It should be understood that the end cap threads 112 of the engaging means 110 may be replaced with another type of releasable coupler, such as a bayonet-style connector, a pin and socket, a quarter-turn connector, and other similar types of connectors or quick release connectors. The external attaching means 120 is a structure that is: (i) designed to receive a loop, hook, strap or any other similar item that can be used to hang the flashlight 10, (ii) a magnet that can be used to couple the flashlight 10 to an object, or (iii) any other structure that may aid in the mounting or positioning of the flashlight 10. For example, the external attaching means 120 is an opening 122. It should be understood that in an alternative embodiment, the external attaching means 120 may be omitted. As shown in FIGS. 6, 10-14, 16, 18, the end cap 100 has knurling 106, which is complementary to knurling 208 of the elongated body 200.

Referring to FIGS. 1-6, 10-14, 16, 18, the elongated main body 200 includes: (i) a first end engaging means 210 formed within the first end 202 and (ii) a second end engaging means 220 formed within the second end 204. In the first embodiment of the flashlight 10, the first end engaging means 210 is a set of the end cap threads 212 that are cooperatively dimensioned with the end cap threads 112 of the end cap 100. The combination of the end cap engaging means 110, and the first end engaging means 210 are configured to releasably secure the power supply within the elongated main body 200. Like above, the end cap threads 212 of the engaging means 210 may be replaced with another type of releasable coupler, such as a bayonet-style connector, a pin and socket, a quarter-turn connector, and other similar types of connectors or quick release connectors.

The second end engaging means 220 is a set of the operational mode selector threads 222 that are cooperatively dimensioned with the operational mode selector threads 312 of the operational mode selector 300. The combination of the operational mode selector engaging means 310 and the second end engaging means 220 are configured to couple the operational mode selector assembly 300 to the elongated main body 200. It should be understood that the operational mode selector engaging means 310 may be replaced with another type of connector, such as a press-fit or interlocking structure. The elongated main body 200 is preferably tubular and, as such, has an internal cavity 206 that receives a power source 250. As described above, the end cap threads 112 of the end cap assembly 100 are designed to mate with the end cap threads 212 of the main body 200. The end cap assembly 100 can be disconnected from the main body 200 by rotating the elongated body 200. As shown in FIGS. 6, 10-14, 16, 18, the elongated main body 200 has knurling 208, which is complementary to knurling 106 of the elongated body 200.

The power source 250 is configured to be positioned within the elongated main body 200. The power source 250 provides electrical power to the flashlight 10. In particular, the power source 250 may be a combination of removable non-rechargeable batteries disposed within a battery cartridge. In some embodiments, the battery cartridge holds nine AAA non-rechargeable batteries. It should be understood that different configurations of the battery cartridge may be implemented. For example, the battery cartridge may be able to: (i) hold additional batteries, such as 12 or 15 total batteries, (ii) fewer batteries, such as 1-9 total batteries, (iii) larger batteries, such as C or D sized batteries, or (iv) smaller batteries, such as AAAA, or AAA sized batteries. Preferably, the battery cartridge has a length that extends along the longitudinal axis 5-5, shown in FIG. 2, of the flashlight 10, which is longer than the width that extends along the horizontal axis of the flashlight 10.

The power source 250 can be configured to allow the power source 250 to supply power to the flashlight 10 regardless of which direction the power source 250 is inserted into the elongated body 200. An exemplary description of such a power source configuration is described in U.S. patent application Ser. No. 16/110,406, which is incorporated herein by reference. It should be understood that instead of being a combination of removable non-rechargeable batteries disposed within a battery cartridge, the power source 250 may be: (i) a removable non-rechargeable battery, (ii) a removable rechargeable battery, (iii) a combination of removable rechargeable batteries, (iv) a combination of removable rechargeable batteries disposed within a battery cartridge, (v) a non-removable rechargeable battery, (vi) a combination of non-removable rechargeable batteries disposed within a battery cartridge, (vii) a D.C. power supply that is configured to connect to a 12-volt car battery, (viii) a D.C. power supply that is configured to connect to a 110-volt alternative current outlet or any other type of power supply that is known to a person of skill in the art. If the power source 250 is rechargeable, then a USB receptacle (e.g., mini, micro, USB-C, etc.) may be disposed on the exterior of the main elongated body 200 or the end cap 100. This would allow the user to charge and/or discharge the rechargeable power source 250 using a USB cable. This could be beneficial because the user can charge their cellular phone from the flashlight 10 without removing the power source 250 from the elongated main body 200.

The operational mode selector assembly 300 includes: (i) a mode selector housing 304, (ii) a switching assembly 310, and (iii) a switch retaining structure 320. The mode selector housing 304 is positioned between an upper extent of the elongated main body 200 and a lower extent of the illumination assembly 400. In particular, the operational mode selector threads 312 of the operational mode selector 300 are configured to interact with the operational mode selector threads 222 of the elongated main body 200 to operably couple the mode selector housing 304 to the elongated main body 200. Likewise, the light source threads 308 of the mode selector housing 304 are configured to interact with the light source threads 424 of the illumination assembly 400 to operably couple the mode selector housing 304 to the illumination assembly 400. The mode selector housing 304 has an opening formed therethrough that is designed to receive an extent of the button 338. This opening allows the user to interact/depress the button 338, which, as will be discussed in greater detail below, changes the operational mode of the flashlight 10.

The switch retaining structure 320 is designed to fit within the mode selector housing 304 and position the switching assembly 310 in the proper position to allow a user to interact with button 338 and for the switching assembly 310 to control the operational mode of the light sources 480, 490. The switching assembly 310 includes circuitry (e.g., fixed resistors, variable resistors, capacitors, inductors, diodes, or other similar components), a contact mechanism 334, button 338, switch printed circuit board (PCB) 340, and electrode contact 344. As described in greater detail below, depressing button 338 also depresses the contact mechanism 334. The depression of the contact mechanism 334 forces the contact mechanism 334 into contact with the switch PCB 340, which in turn changes the operational mode of the flashlight 10. These operational mode changes are first relayed up to the light base printed circuit board (PCB) 340 via electrode contact 344 and then from the light base PCB 340 to the light source PCB 450 via wires (not shown). As discussed in greater detail below, the operational mode selector assembly 300 may take many different structural or functional configurations. For example, the operational mode selector assembly 300 may be replaced with local controls (e.g., a slider, a mechanism that rotates, a plurality of buttons, or other similar structures) or replaced with remote controls (e.g., cellular device, internet enabled device, other R.F. switching controls.

The illumination assembly 400 includes at least two lighting sources. In the embodiment shown in the Figures, illumination assembly 400 includes the primary light source 480 and the secondary light source 490, wherein the primary light source 480 is designed and configured to illuminate objects that are positioned at a distance from the user and/or in front of the primary light source 480, and the secondary light source 490 is designed only to illuminate the indicia 904. Due to the layout of the components of the illumination assembly 400, the secondary light source 490 does not contribute an appreciable amount of light towards illuminating objects that are positioned at a distance from the user and/or in front of the primary light source 480. As such, preferably less than 10% of the light output from the secondary light source 490, and most preferably less than 2% of the light output from the secondary light source 490 illuminates objects that are positioned at a distance from the user and/or in front of the primary light source 480. Thus, illumination of objects that are positioned at a distance from the user and/or in front of the primary light source 480 is provided by the primary light source 480 during operation of the flashlight 10. Most conventional flashlights teach away from the structure and functionality of the disclosed flashlight 10 because a conventional flashlights with a secondary light source utilizes electrical power from the power source to interact with and supplement the primary light source to further illuminate an object that is positioned at a distance from the user and/or in front of the user aiming the flashlight.

The illumination assembly 400 includes: (i) a light source assembly 404, (ii) an indicia assembly 500 that includes at least one indicia 904, and (iii) focusing assembly 600. The light source assembly 400 is comprised of a light source base 420, a light source collar 436, a light source printed circuit board (PCB) 450, the primary light source 480, and the secondary light source 490. The light source base 420 is: (i) designed to support the light source PCB 450 and (ii) is directly coupled to the operational mode selector assembly 300 and, more specifically, the mode selector housing 304 via an internal light source engaging means 422. In this first embodiment, the internal light source engaging means 422 is a set of the light source threads 424 that are cooperatively dimensioned with the light source threads 308 of the mode selector housing 304. It should be understood that in other embodiments, the light source threads 308, 424 may be replaced by other structures or coupling means, such as press-fit, bayonet-style connector, a pin and socket, a quarter-turn connector, and other similar types of connectors.

The light source PCB 450 supports and includes electrical conductive paths that electrically couple the primary light source 480 and secondary light source 490 to the power source 250. The light source PCB 450 is made from a silicon material and is directly coupled to the light source base 420. In this configuration, the light source base 420 may act as a heat sink for the light sources 480, 490. Disposed on top of the light source PCB 450 is a mounting structure 454 configured to interact with an extent of the collimator 604. In particular, the mounting structure 454 includes a projection 458 designed to snuggly fit within the smaller opening 606 of the collimator 604. The fit between these two structures 454, 604 is designed such that an appreciable amount of light cannot escape escapes the collimator 604 and is permitted to radiate through the indicia 904. As such, the height of the projection 458 is almost as high as the top of the lens 484 of the LED 482, and the projection has an inner chamfered edge 458*a* designed to help focus light away from the base of the collimator 604. In an alternative embodiment, a sleeve (not shown) may be added to the flashlight 10 and positioned between the light source PCB and a lower extent of the collimator 604 to help prevent light from the primary light source 480 from leaking out of the collimator 604. This sleeve may be made from a heat shrink or similar plastic material. It should be understood that in other embodiments, the mounting structure 454 may be coupled to the light source base 420 and extend through an opening formed within the light source PCB 450.

Figure 13:
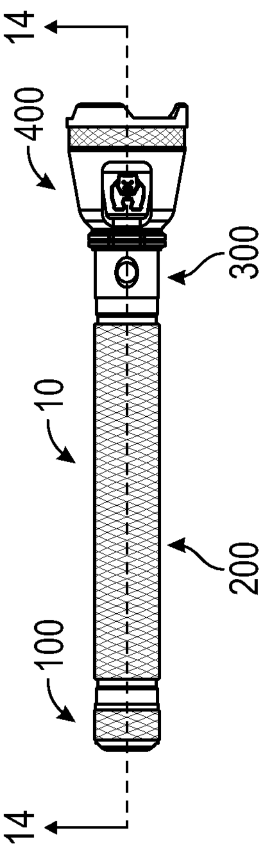
FIG. 13 is a front view of the flashlight of FIG. 1.
Figure 14:
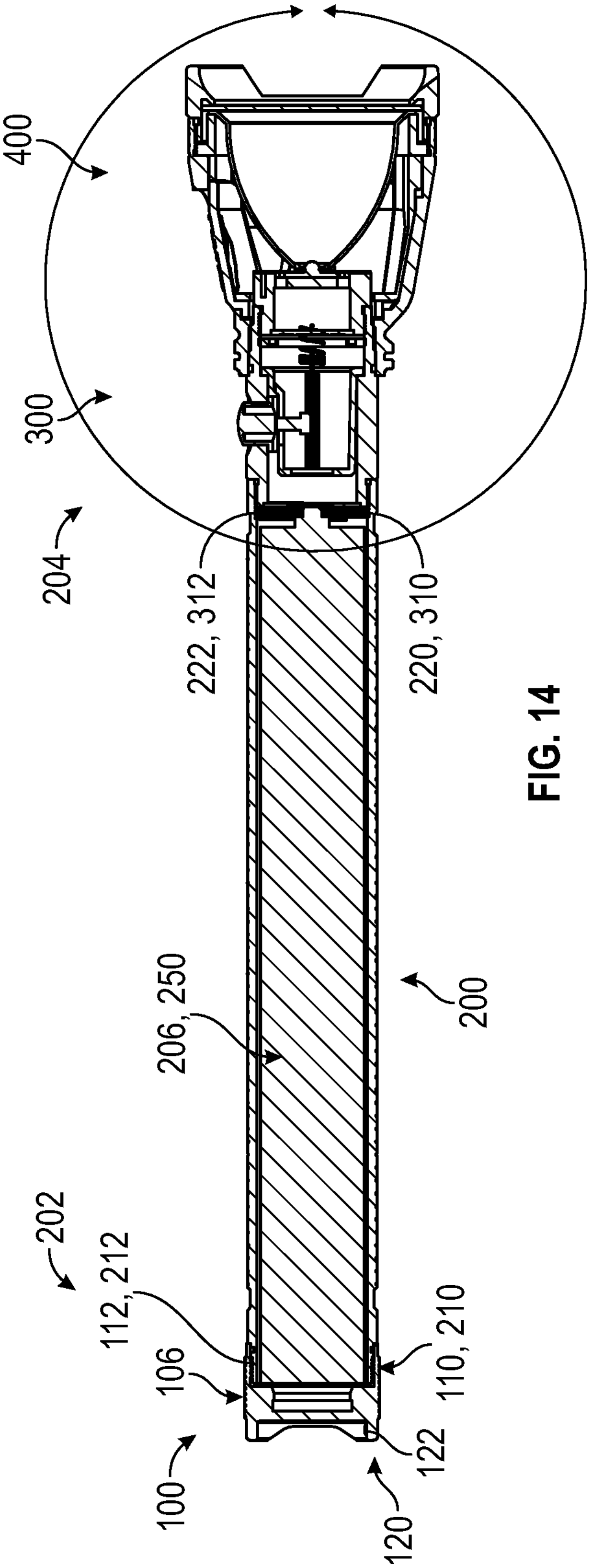
FIG. 14 is a cross-sectional view of the flashlight taken along the line 14-14 of FIG. 13.

The primary light source 480 is substantially centered along the longitudinal axis shown in FIG. 13 by the cross-sectional line 14-14 and positioned within the collimator 604. The primary light source 480 within this first embodiment is a single light emitting diode (LED) 482. This single LED 482 may output between 100 lumens and 10,000 lumens, preferably between 500 lumens and 6,000 lumens, and most preferably between 1000 lumens and 4,000 lumens. While the single LED 482 is outputting 4,000 lumens on a high output mode, the power source 250 can provide power for up to 3 hours. Alternatively, if the single LED 482 is outputting 1,000 lumens on a low output mode, the power source 250 can provide power for up to 5 hours. As shown in the Figures, the primary light source 480 includes a LED chip, a reflective cavity, a wire bond, and a lens. Lens 484 may act as a primary optic, while the lens 630 included within the focusing assembly 600 may act as a secondary optic. It should be understood that in other embodiments, the primary light source 480 may be comprised of multiple light emitters instead of a single light emitter. Additionally, the primary light source 480 may be a Chip on Board ("COB") LED, surface-mount device LED, organic LED, induction light panel, silicon quantum dot phosphor (SiQD-phosphor), or other similar lighting emitting structures. Further, the primary light source 480 may include multiple emitters that output light in different wavelengths (e.g., wavelengths that appear to be in the blue, green, and red spectrum). This may be desirable because the user could change the color temperature or the color of the primary light source 480.

Figure 17:
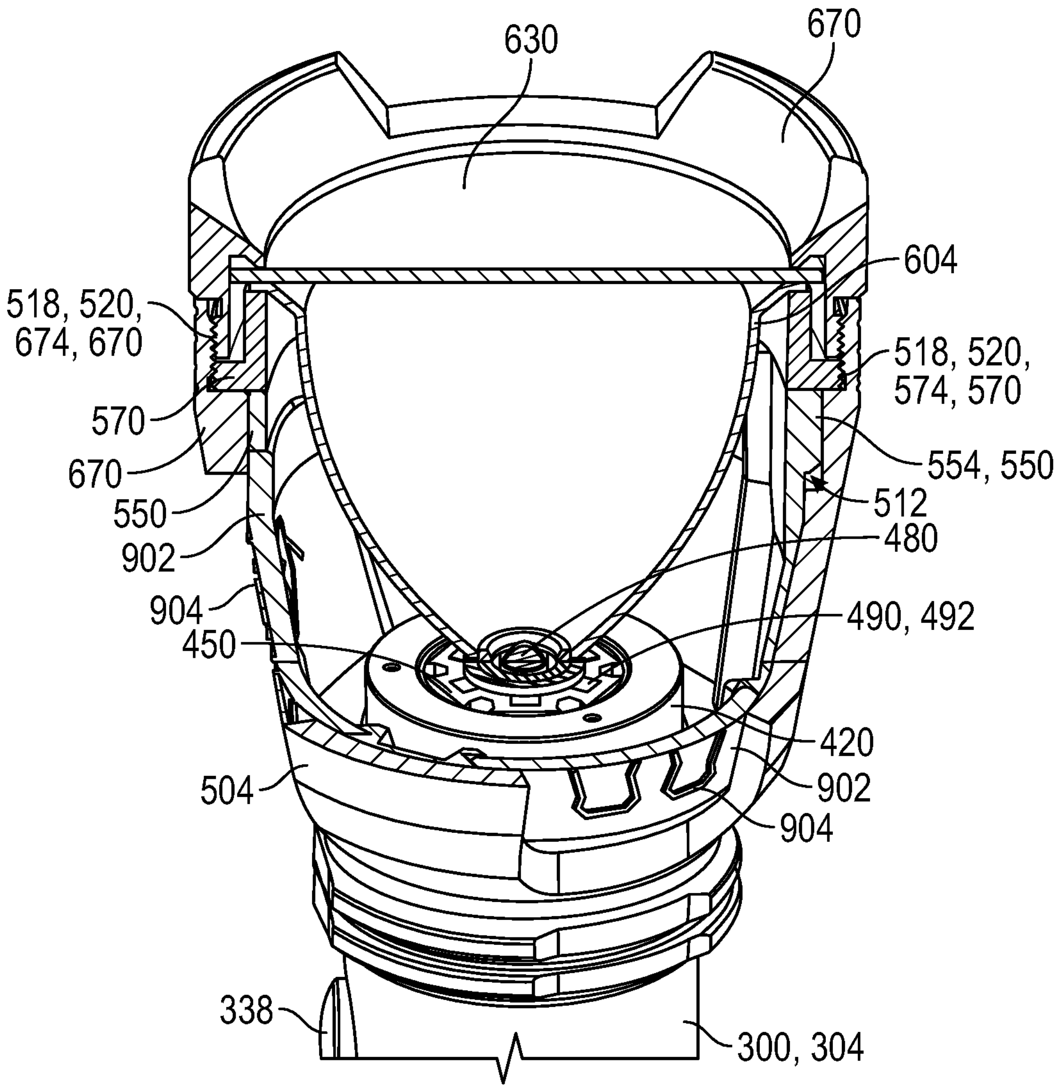
FIG. 17 is a partial cross-sectional view of the flashlight taken along the line 17-17 of FIG. 16.

As best shown in FIG. 17, the secondary light source 490 includes a plurality of light emitters 492 arranged around the periphery of the primary light source 480 and beyond or external to the outer surface 308*b* of the collimator 604. The secondary light source 490 comprises between 1 and 30 individual emitters 492, preferably between 3 and 25 individual emitters 492, and most preferably between 4 and 8 individual emitters 492. The individual emitters 492 have a COB LED structure and do not have a lens disposed over the LED. Thus, the indicia 904 acts as a primary optic or lens. It should be understood that in other embodiments, the secondary light source 490 may be comprised of single light emitter instead of multiple light emitters. Additionally, the secondary light source 490 may be a standard LED, surface-mount device LED, organic LED, induction light panel, silicon quantum dot phosphor (SiQD-phosphor), or other similar types of lighting emitting structures. Further, the secondary light source 490 may include a single emitter or multiple emitters that output light in different wavelengths (e.g., wavelengths that appear to be in the blue, green, and red spectrum). This may be desirable because the user could change the color temperature or the color of the secondary light source 490.

The indicia assembly 500 is designed to retain and position at least one indicia panel 900 in the proper position external to or radially outward of the collimator 604. The indicia assembly 500 includes: (i) illumination housing 504, (ii) at least one indicia panel 900 that includes an indicia 904, (iii) indicia panel retainer 550, and (iv) indicia collar 570. The illumination housing 504 receives and is directly coupled via a press-fit coupler to an extent of the mode selector housing 304. This configuration properly positions the primary and secondary light sources 480, 490 within the illumination housing 504. As shown in the Figures, the flashlight 10 has three distinct indicia panels 900 that are angularly spaced 120 degrees apart along the periphery of the illumination assembly 400. Alternatively, the flashlight 10 has a lesser number of indicia panels 900 that can be configured with a larger or smaller panel than that shown in the Figures. Also, the flashlight 10 can include a large, single indicia panel 900 that extends along the entire periphery of the illumination assembly 400, whereby the panel 900 has a ring configuration when the illumination assembly 400 has a conical or tubular configuration. In even a further embodiment, the flashlight 10 may include more than three indicia panels 900.

The illumination housing 504 has: (i) at least one indicia opening 506 formed within the sidewall 508 to allow at least one indicia panel 900 to be visible from the exterior of the flashlight 10, (ii) a receiver 512 that is designed to receive an extent of the indicia panel retainer 550, and (iii) a collar engaging means 518. In the first embodiment, the collar engaging means 518 is a set of the collar threads 520 that are cooperatively dimensioned with: (i) the indicia collar threads 574 of the indicia collar 570 and (ii) the lens collar threads 674 of the lens collar 670. It should be understood that in other embodiments, the threads 520, 574, 674 may be replaced by other structures or coupling means, such as press-fit, bayonet-style connector, a pin and socket, a quarter-turn connector, and other similar types of connectors.

Figure 19:
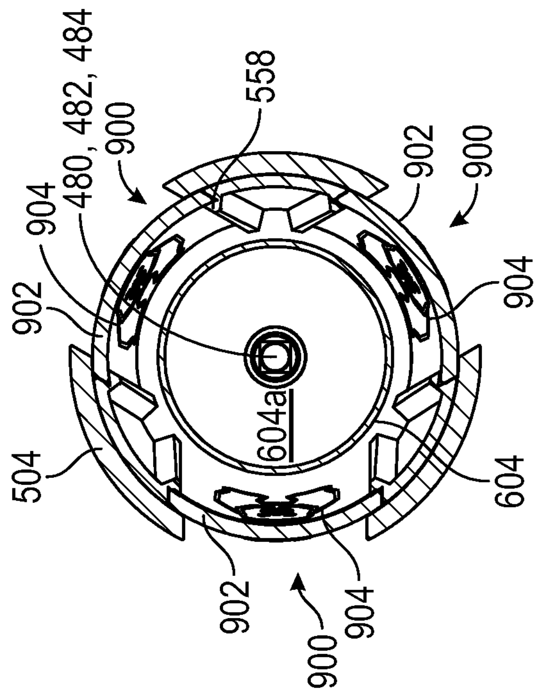
FIG. 19 is a cross-sectional view of the flashlight taken along line 19-19 of FIG. 18.
Figure 18:
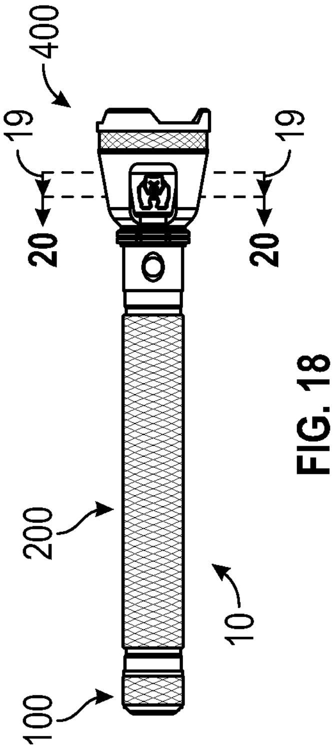
FIG. 18 is a front view of the flashlight of FIG. 1.
Figure 20:
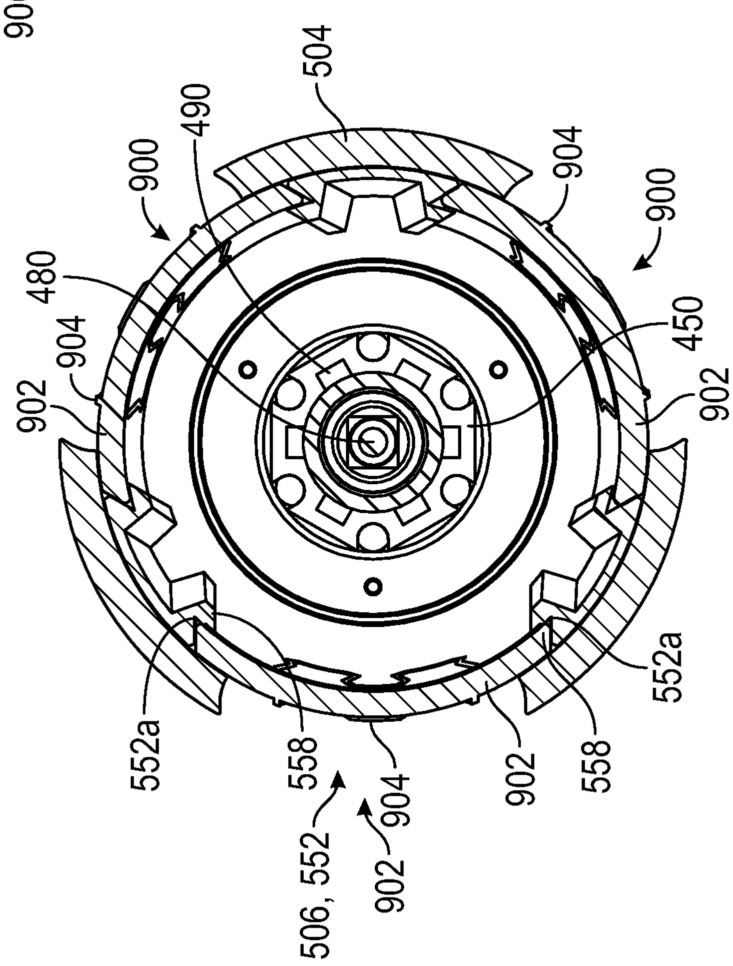
FIG. 20 is a cross-sectional view of the flashlight taken along line 20-20 of FIG. 18.
Figure 21:
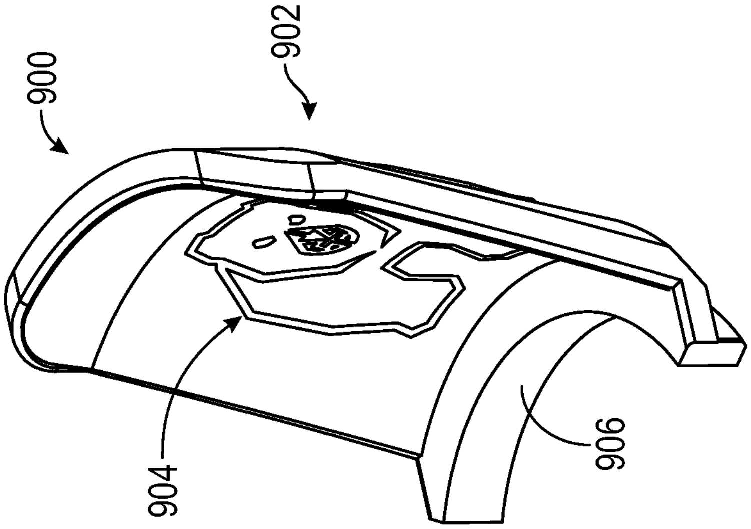
FIG. 21 is a perspective view of the indicia assembly of the flashlight of FIG. 1.
Figure 22:
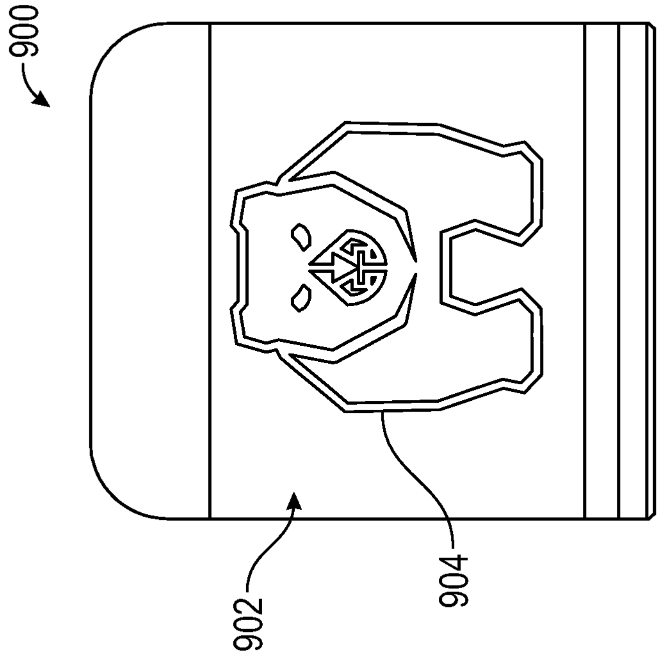
FIG. 22 is a front view of the indicia assembly.
Figure 23:
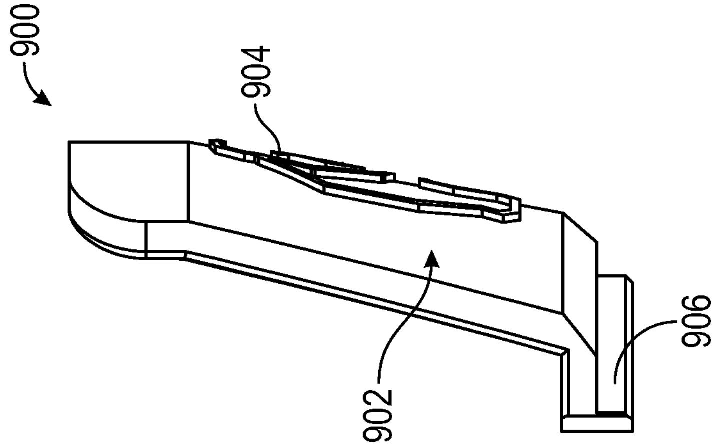
FIG. 23 is a side view of the indicia assembly.
Figure 24:
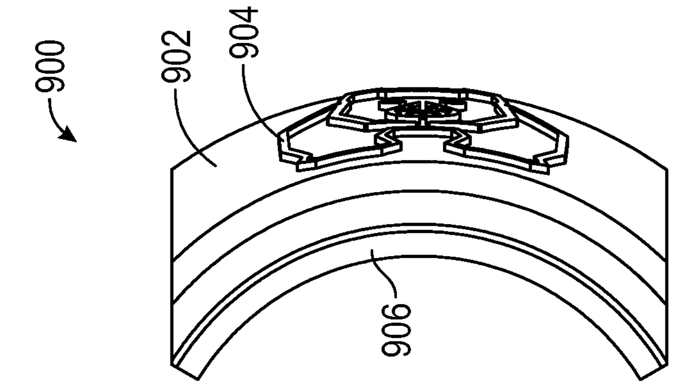
FIG. 24 is a bottom view of the indicia assembly.

As best seen in FIGS. 21-24, the at least one indicia panel 900 includes: (i) a body 902, (ii) an indicia 904, (iii) a retaining lip 906. As best shown in FIGS. 19-20, the indicia panel body 902 is designed to fit snuggly within the indicia aperture 552 of the indicia panel retainer 550 and be aligned with the indicia opening 506 in the illumination housing 504. This configuration permits: (i) the outer surface of the indicia panel 900 to be positioned against an inner surface of the illumination housing 504 and (ii) the outer surface of the indicia panel 900 to form a substantially smooth exterior surface with the outer surface of the indicia panel retainer 550. In other words, the outer surface of the indicia panel 900 is not aligned with the outer surface of the illumination housing 504. The designer/manufacture should ensure that the indicia panel 900 fits snug within the indicia aperture 552 because the lack of a snug fit may allow light to escape from the illumination housing 504 without exiting through the indicia 904, wherein the light that escapes may undesirably overpower the light that shines through the indicia 904. Additionally, the lack of a snug fit may allow the elements from the outside environment within the housing 504, which in turn may lead to premature failure of the flashlight 10. Thus, to help ensure that there is a snug fit between the periphery of the indicia aperture 552 and the periphery of the indicia panel 900, both peripheries include a chamfered periphery. The indicia panel 900 is positioned outside of or radially outward from the secondary light source 490 and the collimator 604 is positioned inside of radially inward from the secondary light source 490.

In an alternative embodiment, it may be desired to allow a small amount of light to escape around the panel to accent the panel's edges. If this is desired, then the designer may not make the panel fit snugly within the opening 506 and instead may provide a bit of an offset between the periphery of the indicia opening 506 and the periphery of the indicia panel 900. Also, in another alternative embodiment, the outer surface of the indicia panel 900 may not be positioned against an inner surface of the illumination housing 504 and instead may be aligned with the outer surface of the illumination housing 504. In this alternative embodiment, the illumination housing 504 may have a substantially smooth exterior surface.

The indicia 904 may be an insignia, symbol, name, lettering, animal, brand, make, model, sign, trademark, or distinguishing mark. Examples of such indicia 904 may be a brand's logo or the first letter of a brands name. The indicia 904 may be formed within the body 902 by any known method, including laser cutting, CNC router, or other methods of removing material from the body 902. Alternatively, the indicia 904 may be formed within the body 902 during the process of forming the body 902. For example, a structure that represents the indicia 904 may be placed within the mold of the body 902 prior to injecting the mold with plastic. Additionally, the body 902 may be formed using a 3D printing method, wherein the indicia 904 is not printed during the printing of the body 902. Once the body 902 is fabricated, the opening that is formed in the shape of the indicia 904 is filled in with a transparent or translucent material. Such materials that may be used are clear plastics. It should be understood that this filler material may be colored in a manner that can filter the light that is emitted by the secondary light source 490, which could allow a designer to use a white LED in connection with the secondary light source 490. Alternatively, the filler material may not be colored, and thus the designer may use one or more colored light emitters in connection with the secondary light source 490 to illuminate the indicia 904 in the desired color.

In contrast to cutting entirely through the body 902 of panel 900 and then filling in the opening formed there though with a transparent or translucent material, a recess is formed within the body 902 in the same shape as the indicia 904 and is sufficiently deep to thin the body 902 such that it is translucent. In a further embodiment, the designer may use a combination of these methods, wherein the body 902 is thinned and then filled with a transparent material. In even a further embodiment, the designer may choose to make the body 902 out of a transparent or translucent material and make the indicia out of a not transparent or translucent material. This inversed design will allow light from the secondary light source 490 to exit the housing 504 around the indicia 904.

Figure 15A:
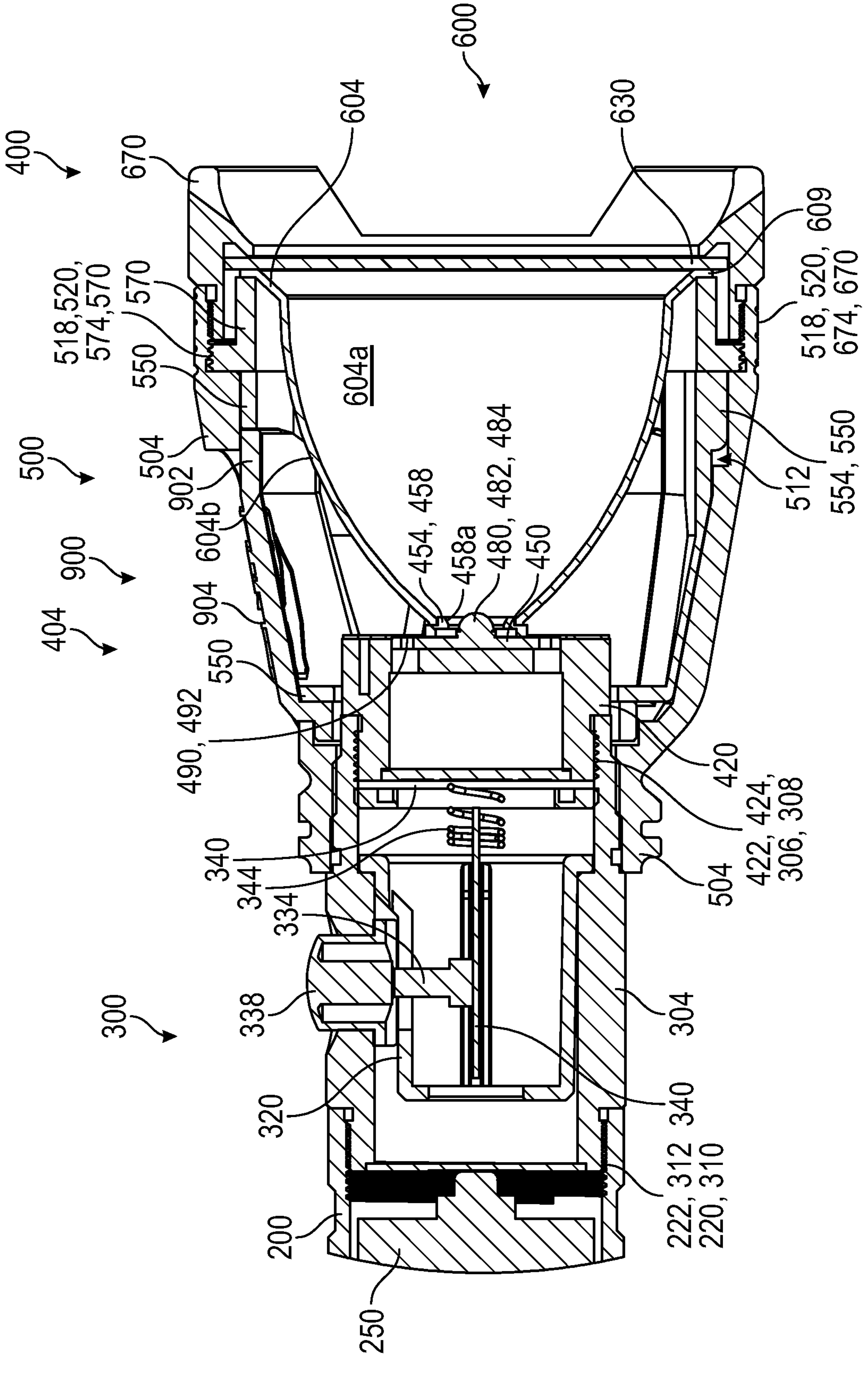
FIG. 15A is a zoomed-in view of a frontal extent of the flashlight of FIG. 14.

As shown in FIG. 15A, the retaining lip 906 of the panel 900 is designed to be: (i) vertically positioned between an extent of the illumination housing 504 and the light source base 420 and (ii) horizontally positioned between an extent of the illumination housing 504 and the indicia panel retainer 550. Also, the indicia panel retainer 550 is held in place by a combination of the indicia collar 570 and the receiver 512 that is designed to receive a projection 554 of the indicia panel retainer 550. It should be understood that other mechanisms of coupling panel 900 within the illumination assembly 400 are contemplated, including other edge/bevel geometries for panel 900 and its abutted components, hinged mechanisms, and other mechanisms. For example, one alternative would be to omit the panel 900 and form the indicia 904 within housing 504. As will be discussed below in connection with FIGS. 25-29, this disclosure contemplates forming the indicia 904 within a flashlight handle with or without a panel (see FIG. 25), in the center of the housing with or without a panel (see FIG. 26), in the base of the flashlight with or without a panel (see FIG. 27), in the button or tail of the flashlight (see FIG. 28), or within the top of the flashlight with or without a panel (see FIG. 29). Other locations for the indicia 904 are contemplated by this disclosure.

As described above, the indicia panel retainer 550 is configured to be positioned within the illumination housing 504 and has an outer surface designed to be positioned against the inner surface of the illumination housing 504. The indicia panel retainer 550 includes a projection 558 that extends from the innermost point of the periphery 552*a*. This projection 558 is positioned behind an extent of the panel 900 to help secure the panel 900 within the flashlight 10. Also, as described above, the indicia panel retainer 550 is held in place by the indicia collar 570 when the indicia collar 570 is held in place by the engagement between the collar threads 520 and the indicia collar threads 574. Further, as described above, it should be understood that in other embodiments, the threads 520, 574 may be replaced by other structures or coupling means, such as press-fit, bayonet-style connector, a pin and socket, a quarter-turn connector, and other similar types of connectors.

Referring to FIGS. 10-12, 14-15B, 17, 29-20, the illumination assembly 400 has a focusing assembly 600 that includes a lens collar 670, a lens 630, and a collimator 604. The lens collar 670 includes a number of projections that extend away from the flashlight 200 and are designed to protect the lens 630. The lens collar 670 also has a lens collar engaging means 672. In the first embodiment, the lens collar engaging means 672 is a set of the lens threads 674 that are cooperatively dimensioned with the collar threads 520 of the housing 504. It should be understood that in other embodiments, the lens threads 674 of the lens collar engaging means 672 may be replaced by other structures or coupling means, such as press-fit, bayonet style connector, a pin and socket, a quarter-turn connector and other similar types of connectors.

The lens 630 is designed to act as a secondary optic because the LED that is used in connection with primary light source 480 already has a covering that acts as a primary optic. However, in other embodiments, the lens 630 may act as a primary optic because the light source (e.g., COB LED) utilized does not include a covering. The lens 630 may have a cross-sectional shape that is: (i) substantially rectangular, (ii) convex, or (iii) concave. This cross-sectional shape may be chosen based on the desired light distribution and the type of primary light source 480. As shown in the Figures, the primary and secondary light sources 480, 490 are positioned rearward from the lens 630. The lens 630 may be made from any type of transparent material, such as plastic. Also, the lens 630 may include O-rings or gaskets positioned between the lens 630 and the collars 570, 670. These O-rings or gaskets may increase the flashlights 10 waterproof ratings and may increase the durability of the lens 630 because they may provide some energy absorbing properties.

Referencing to FIGS. 9, 14, 15A, 17, and 19, the collimator 604 has: (i) a first extent that abuts a portion of the mounting structure 454, (ii) a second extent receives the mounting structure's projection 458, and (iii) a third extent that is positioned between the indicia collar 570 and the lens 630. The collimator 604 includes curvilinear sidewalls that substantially form a cone shape. The inner surface 604*a* of the collimator 604 includes a reflective coating, such that a minimal number of photons from the primary light source 480 are absorbed by the collimator 604 and the overwhelming majority of photons from the primary light source 480 are reflected and remain inside the collimator 604. Likewise, the outer surface 604*b* of the collimator 604 includes a reflective coating, such that a minimal number of photons from the secondary light source 490 are absorbed by the collimator 604 and the overwhelming majority of photons from the secondary light source 490 are reflected and remain outside of the collimator 604. The collimator 604 may be made from plastic or metal and is designed to focus the light emitted by either one of the light sources 480, 490 out of their respective openings. It should be understood that either one of the reflective coatings can be omitted in an alternative embodiment.

Figure 15B:
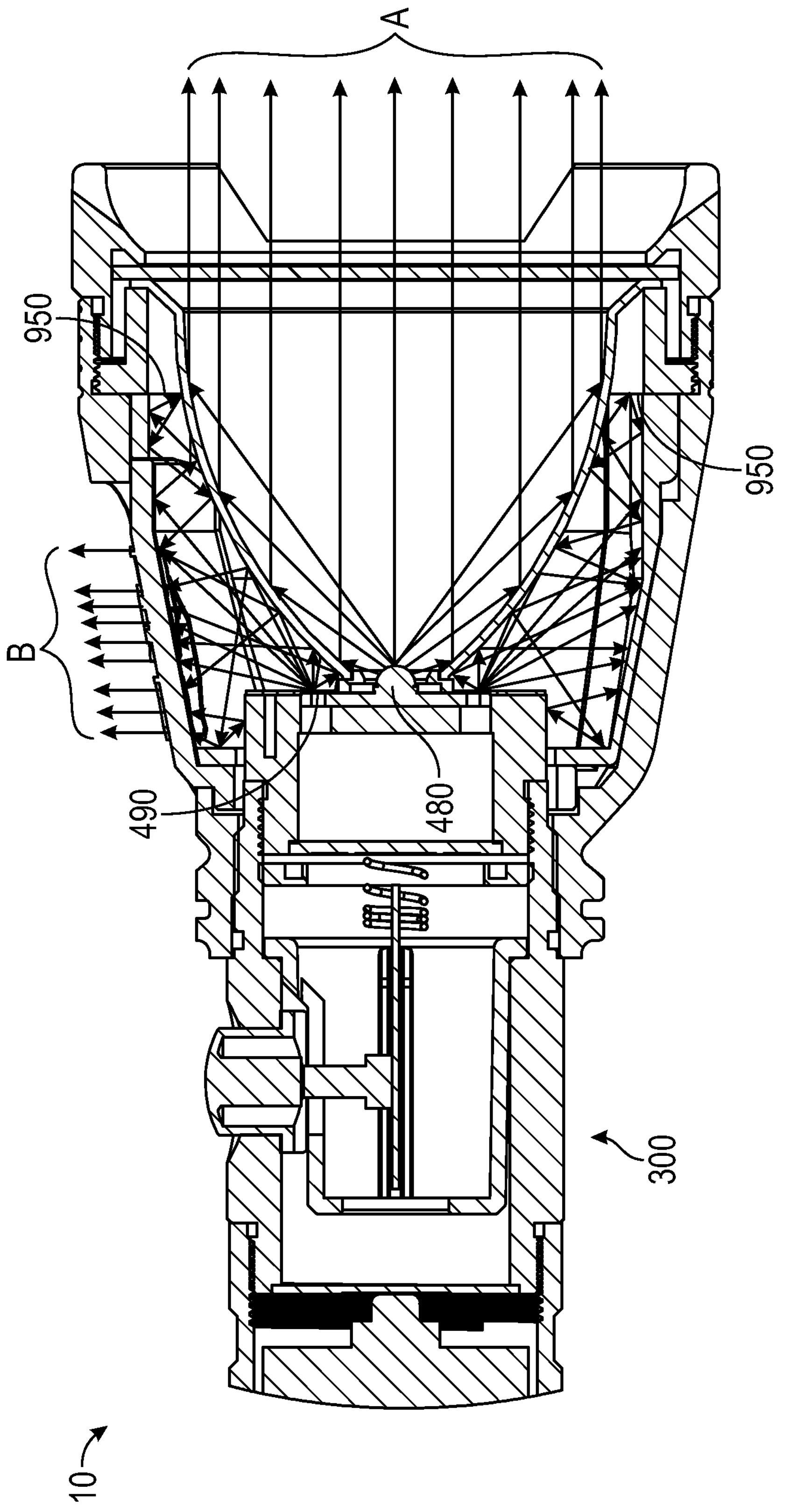
FIG. 15B is a zoomed-in view of a frontal extent of the flashlight of FIG. 14, showing ray-traces of the light that is emitted from each of the primary light source and the secondary light source.
Figure 16:
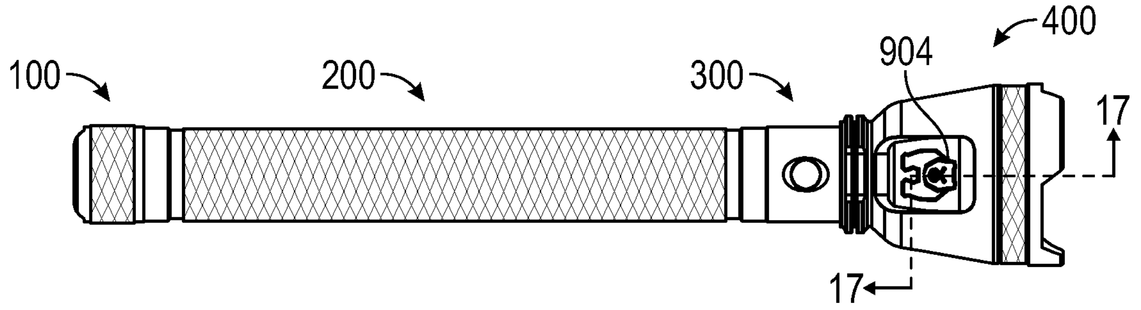
FIG. 16 is a front view of the flashlight of FIG. 1.

FIG. 15B depicts operating stages of the flashlight 10, where light—labeled A—that is emitted from the primary light source 480 exits out of the lens 630 in a direction that is substantially parallel with the elongated main body 200 of the flashlight 10, while light—labeled B—that is emitted from the secondary light source 490 exits out of the indicia 904 in a direction that is substantially perpendicular with the elongated main body 200 of the flashlight 10. Due to the configuration of the illumination assembly 400, including the layout of its components: (i) an appreciable amount of light emitted from the secondary light source 490 cannot mix with light provided by the primary light source 480 within the confines of the flashlight 10 and (ii) an appreciable amount of light emitted from the primary light source 480 does not radiate through the indicia 904. Due to the configuration of the illumination assembly 400, including the layout of its components: (i) an appreciable amount of light emitted from the primary light source 480 cannot mix with light provided by the secondary light source 490 within the confines of the flashlight 10 and (ii) an appreciable amount of light emitted from the secondary light source 490 does not radiate through the lens 630. In other words, the light that is emitted by the primary light source 480 is designed to illuminate an object that is positioned a distance in front of or forward of the direction the flashlight 10 is oriented, while the light that is emitted from the secondary light source 490 is not designed to aid in the illumination of that same object. Instead, the secondary light source 490 is designed to illuminate the indicia 904 to provide a "locator function" at a low brightness, namely less than 100 lumens, which allows a user to locate and find the flashlight 10 in a dark environment. In addition, the secondary light source 490 illuminates the indicia 904 to improve brand/model recognition and awareness to the user and potential customers. An optional reflector 950 may be positioned between the inner surface of the indicia panel retainer 550 and the collimator 604 to prevent the light from the secondary light source 490 from entering an area that is near the upper edge of the collimator 604 and away from the indicia 904. In another embodiment, the optional reflector 950 may be omitted and the light from the secondary light source 490 may radiate within the space between the outer surface of the collimator 604 and the illumination housing 504/indicia panel 900.

The switch assembly 310 of the flashlight 10 enables the user to alter the operational mode of the flashlight 10. This is done by altering the current that can pass from the power source 250 to flow to turn "On" either: (i) only the primary light source 480, (ii) only the secondary light source 490, or (iii) both the primary and secondary light sources 480, 490. In an illustrated embodiment, the switch assembly 310 is activated by a button 338 that the user depresses and releases to change the operational mode of the flashlight 10. For example, the user: (i) may depress the button 338 one time to place the primary light source 480 in the "On" mode, while the secondary light source 490 remains in the "Off" mode, (ii) may depress the button 338 two times to place the primary light source 480 in the "Off" mode, while the second light source remains in the "Off" mode, (iii) may depress the button 338 three times to place the primary light source 480 in a flashing mode, (iv) may depress the button 338 and hold the button 338 in a depressed state for a first predefined about of time to place both the primary light source 480 and secondary light source 490 in the "On" mode, and (v) may depress the button 338 and hold the button 338 in a depressed state for a second predefined about of time to place the secondary light source 490 in the "On" mode, while placing the primary light source 490 in the "Off" mode. Other buttons, switches, dials, or other similar controlling structures may be utilized to control the operational mode of the primary light source 480 and the secondary light source 490.

It is to be understood that the switch assembly 310 can be positioned at any free location in flashlight 10, such as in the end cap 100. It should also be understood that the switch assembly 310 may be replaced with an assembly that is configured to utilize: (i) one or more buttons, switches, sliders, sensors (e.g., motion, light, sound, or heat) physically coupled to the flashlight 10, or (ii) one or more buttons, switches, sliders, sensors (e.g., motion, light, sound, or heat) positioned at a distance from the flashlight 10. Examples of remote devices that may be utilized include cell phone application, laptop, R.F. remote control, or remote devices described in U.S. patent application Ser. No. 15/812,852, and which is fully incorporated herein by reference. It should be understood that each lighting source 480, 490 may be controlled by a single switch assembly 310 or may each lighting source 480, 490 may be controlled by a separate switch assembly.

The secondary light source 490 may be moved from the "Off" mode to the "On" mode when based on an input from a sensor (e.g., motion, light, sound, heat, or wireless signal). For example, the secondary light source 490 may turn to the "On" mode when: (i) the user presses the button 338, (ii) when the sensor detects movement (e.g., user is moving their hand around to try and find the flashlight 10 in a dark environment), (iii) when the sensor detects the presence of a wireless device (e.g., Bluetooth or NFC wireless transmissions for a user's phone), (iv) when the flashlight 10 is placed in a dark environment, as determined by a light sensor, or (v) in response to a user's voice or other noises made by a user. If one of the above events causes the secondary light source 490 to move from the "Off" mode to the "On" mode, the secondary light source 490 will stay in the "On" mode for a predetermined amount of time. After this predetermined amount of time has expired, the secondary light source 490 will move from the “On” mode to the “Off” mode. Overall, these alternative methods for turning on the secondary light source 490 may aid the user in finding the flashlight 10 in a limited amount of ambient light.

Portable lights or flashlights 1010, 2010, 3010, 4010, 5010 that are shown FIGS. 25-29, as similar to the portable light or flashlight 10 that is described above. For sake of brevity, the above disclosure in connection with portable light 10 will not be repeated below, but it should be understood that across embodiments like numbers represent like structures. For example, the disclosure relating to indicia 904 applies in equal force to indicia 1904, 2904, 3904, 4904, 5904. Further, it should be understood that the operational modes of the portable light 1010, 2010, 3010. 4010, 5010 are similar to, or identical to, those disclosed regarding portable light 10. Moreover, it is to be understood that any one or more features of the portable light 10 can be used in conjunction with those disclosed regarding the portable lights 1010, 2010, 3010, 4010, 5010, and that any one or more features of the portable lights 1010, 2010, 3010, 4010, 5010 can be used in conjunction with those disclosed regarding the portable light 10.

Figure 29:
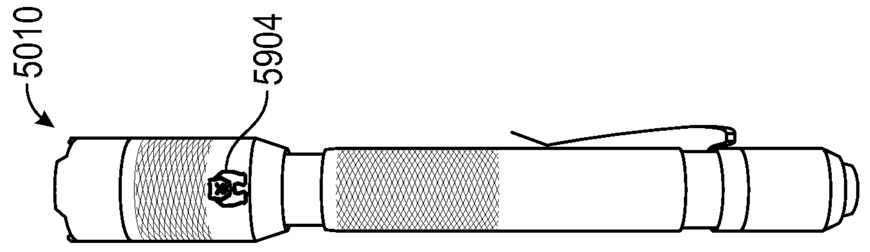
FIG. 29 is a sixth embodiment of an inventive flashlight showing a sixth version of an indicia assembly.
Figure 26:
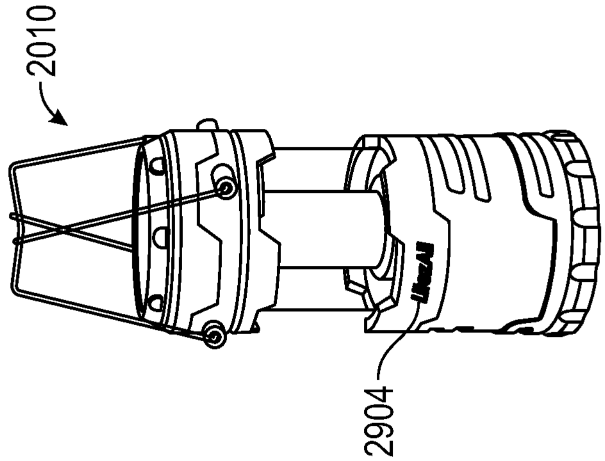
FIG. 26 is a third embodiment of an inventive flashlight showing a third version of an indicia assembly.
Figure 28:
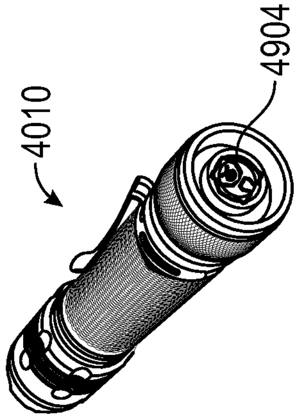
FIG. 28 is a fifth embodiment of an inventive flashlight showing a fifth version of an indicia assembly.
Figure 25:
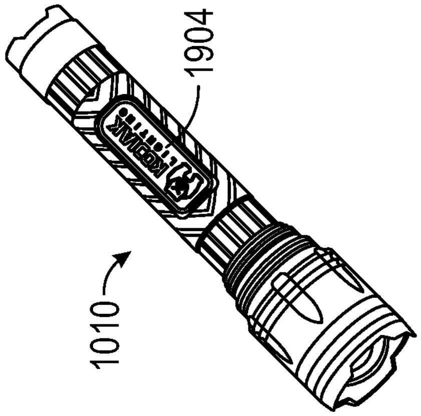
FIG. 25 is a second embodiment of an inventive flashlight showing a second version of an indicia assembly.
Figure 27:
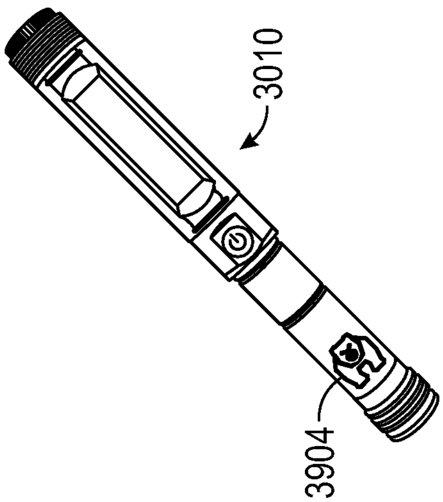
FIG. 27 is a fourth embodiment of an inventive flashlight showing a fourth version of an indicia assembly.

Instead of positioning the panel 900 within the cone of the flashlight 10 as shown in FIGS. 1-24, the panel 900 with the indicia 904 or just the indicia 904 may be positioned within other locations on the flashlight 10. For example, FIG. 25 show that the panel 1900 may be positioned in the handle of the flashlight 1010 and FIG. 26 shows that the panel 2900 can be omitted and the indicia 2904 be formed within the main body 2200 of the flashlight 10. Additionally, FIG. 27 similarly shows that the panel 3900 can be omitted and the indicia 3904 be positioned within the base or lower extent of the main body 3200 and FIG. 28 shows that the indicia 4904 can be positioned on the button 4338 that is contained within the tail of the flashlight 4010. Finally, FIG. 29 shows that the indicia 5904 can be positioned near the top of the flashlight 5010 without using a panel 5900. Further and alternative combinations are contemplated by this disclosure. Also, as described above, these figures show that the indicia 1904, 2904, 3904, 4904, 5904 may include tradenames, trademarks, wording, letters, symbols, or other marks that would allow a user to identify the flashlight 10 manufacture, designer, or retailer.

To enable the illumination of the indicia 904, 1904, 2904, 3904, 4904, 5904, these embodiments may place the secondary light source behind the indicia in a manner that is similar to the embodiment that is shown in FIGS. 1-24. However, the positioning of the secondary light source within these locations may not be desired because of space and product geometry. Thus, the secondary light source may be positioned within the illumination assembly or the tail assembly and a waveguide may be used to transfer light from the secondary light source to the indicia 904, 1904, 2904, 3904, 4904, 5904. This waveguide may be made from a fiber optical material, plastic, or any other similar material.

In some embodiments, the flashlight 10, 1010, 2010, 3010, 4010, 5010 may be waterproof (e.g., ip67 or ip68) or weather proof. In other embodiments, the flashlight 10 may be configured to have an internal compartment for storage of the user’s items (e.g., keys, money, medicine or other accessories). In a further embodiment, an extent of the elongated body 200 may have a magnet contained therein to allow the flashlight 10 to magnetically couple to a magnetic surface. In an even further embodiment, the flashlight 10 may include a speaker and a wireless module (e.g., a module that is compatible with Bluetooth, NFC, Felica, WiFi, Zigbee, RFID, cellular, WiMAX, ISM, or any combination of these technologies) to enable a user to play music from the flashlight 10. In this embodiment, the flashlight 10 may play a sound in response to an external stimuli (e.g., sound, heat, motion, R.F. beacons, etc.) to aid in the location of the flashlight 10. In another embodiment, the flashlight 10 may include an ultraviolet light that is designed to attract and kill bugs. In another embodiment, the collimator 604 may be removed and light from the primary light source 480 may mix with light from the secondary light source 490 to illuminate the indicia 904. Other embodiments or combinations of the above embodiments are contemplated by this disclosure.

While some implementations have been illustrated and described, numerous modifications come to mind without significantly departing from the spirit of the disclosure; and the scope of protection is only limited by the scope of the accompanying claims. For example, the overall shape of the flashlight 10 may be altered to be any one of the following shapes a triangular prism, a rectangular prism, a cube, a pentagonal prism, a hexagonal prism, octagonal prism, sphere, a cone, a tetrahedron, a cuboid, a dodecahedron, a icosahedron, a torus, a octahedron, a ellipsoid, or any other similar shape.

The power source 250 can be a rechargeable battery that is not intended to be removed from the elongated body 200. The elongated body 200 may be formed from: (i) metal, such as aluminum or steel, (ii) a polymer material, such as plastic, (iii) a magnetic material, (iv) a material that floats in water, or (v) a combination of the prior material. The lens 630 may be made from a polymer material, such as plastic, and may be transparent, partially transparent, or colored.

Headings and subheadings, if any, are used for convenience only and are not limiting. The word exemplary is used to mean serving as an example or illustration. To the extent that the term includes, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

The invention claimed is:

1. A portable lighting device comprising:

a main body that includes a receiver having an internal power source, wherein the main body includes a removable end cap that encloses the receiver;

an illumination assembly with an external housing sealingly connected to the main body to ensure that the portable lighting device meets an IP67 or IP68 waterproof rating standard, the illumination assembly having: (i) a primary light source capable of being turned "ON" or "OFF" and having a plurality of output modes, and (ii) a secondary light source configured to independently illuminate an indicia located in a sidewall of the portable lighting device;

a depressible button configured to turn ON and turn OFF the primary light source; and a rotatable dial configured to select an output mode from the plurality of output modes of the primary light source, wherein the rotatable dial is positioned between the main body and the illumination assembly;

wherein when the primary light is turned ON, said primary light source is configured to emit light axially from the main body but is not configured to illuminate the indicia.

2. The portable lighting device of claim 1, includes a power source coupled to both the illumination assembly and a USB-C receptacle.

3. The portable lighting device of claim 1, wherein said plurality of output modes of the primary light source includes at least a high output mode and a low output mode.

4. The portable lighting device of claim 1, wherein the indicia is a single letter of the name of the brand associated with the portable lighting device.

5. The portable lighting device of claim 1, wherein a majority of the light that is emitted from the primary light source is oriented in a direction that is substantially perpendicular to a majority of the light that is emitted from the secondary light source.

6. The portable lighting device of claim 5, wherein an extent of the secondary light source is positioned radially outward from the primary light source.

7. The portable lighting device of claim 1, wherein the primary light source is a light emitting diode (LED) mounted on a printed circuit board, and wherein the illumination assembly includes a collimator positioned adjacent to the LED and the printed circuit board.

8. The portable lighting device of claim 7, wherein the secondary light source is located external to the collimator.

9. The portable lighting device of claim 7, wherein the LED is a surface mount LED.

10. A portable lighting device comprising:

a cylindrical main body that includes a receiver that is enclosed by a removable cap;

a power source positioned within the receiver of the main body;

an illumination assembly with an external housing sealingly connected to the main body to ensure that the portable lighting device meets an IP67 or IP68 waterproof rating standard, the illumination assembly coupled to the power source and having: (i) a primary light source having a plurality of output modes, and (ii) a secondary light source configured to independently illuminate an indicia located in a sidewall of the illumination assembly;

a rotatable dial configured to select an output mode from the plurality of output modes of the primary light source, wherein the rotatable dial is positioned between the main body and the illumination assembly; and wherein an extent of the light emitter of the secondary light source is positioned radially outward from the light emitter of the primary light source.

11. The portable lighting device of claim 10, further comprising a button configured to control the primary light source.

12. The portable lighting device of claim 11, wherein a light emitter of the secondary light source is positioned adjacent to the button and emits colored light.

13. The portable lighting device of claim 10, wherein actuation of the rotatable dial changes an output mode of the primary light source between a high output mode and a low output mode.

14. The portable lighting device of claim 10, wherein the portable lighting device includes a USB-C receptacle that is coupled to the power source.

15. A portable lighting device comprising:

a main body having a longitudinal axis and a receiver having an internal power source, wherein the main body includes a removable end cap that encloses the receiver;

a primary light source configured to emit light axially from the main body through a lens positioned near an open end of the portable lighting device;

a depressible button located an appreciable distance from the primary light source, wherein the depressible button is configured to switch the primary light source between ON and OFF states;

a secondary light source configured to emit light perpendicular to the longitudinal axis and independently illuminate an indicia located on the depressible button when the depressible button is depressed by a user;

wherein, during operation of the portable lighting device:

(i) an appreciable amount of light emitted from the primary light source does not mix with light that is emitted from the secondary light source, and (ii) a majority of the light that is configured to be emitted from the primary light source is oriented in a direction that is substantially perpendicular to a majority of the light that is configured to be emitted from the secondary light source.

16. The portable lighting device of claim 15, wherein the indicia is a single letter of the name of a brand associated with the portable lighting device.

17. The portable lighting device of claim 15, wherein the secondary light source is comprised of a plurality of light emitters that are arranged radially outward of the primary light source.

18. The portable lighting device of claim 15, further comprising an operational mode selector that includes a rotatable dial, and wherein said dial is configured to select an output mode of the primary light source from a plurality of output modes.

19. The portable lighting device of claim 15, wherein the light emitted from the primary light source is a first color, and the indicia is illuminated in a second color that is different from the first color.

20. The portable lighting device of claim 15, wherein the portable lighting device meets or exceeds an IP67 or IP68 waterproof rating standard.

* * * * *